United States Patent
You et al.

(10) Patent No.: US 9,300,510 B2
(45) Date of Patent: Mar. 29, 2016

(54) METHOD OF TRANSMITTING AND RECEIVING DATA UNIT IN WIRELESS LOCAL AREA NETWORK SYSTEM AND APPARATUS FOR THE SAME

(71) Applicant: LG ELECTRONICS INC., Seoul (KR)

(72) Inventors: Hyang Sun You, Anyang-si (KR); Yong Ho Seok, Anyang-si (KR); Jong Hyun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/362,370

(22) PCT Filed: Dec. 10, 2012

(86) PCT No.: PCT/KR2012/010679
§ 371 (c)(1),
(2) Date: Jun. 2, 2014

(87) PCT Pub. No.: WO2013/085362
PCT Pub. Date: Jun. 13, 2013

(65) Prior Publication Data
US 2014/0328435 A1 Nov. 6, 2014

Related U.S. Application Data

(60) Provisional application No. 61/568,171, filed on Dec. 8, 2011.

(51) Int. Cl.
*H04L 27/00* (2006.01)
*H04L 27/26* (2006.01)
*H04L 1/00* (2006.01)
(Continued)

(52) U.S. Cl.
CPC .......... *H04L 27/2602* (2013.01); *H04L 1/0041* (2013.01); *H04L 1/0071* (2013.01); *H04L 1/0075* (2013.01); *H04L 1/0625* (2013.01); *H04L 1/08* (2013.01); *H04L 27/2628* (2013.01);
(Continued)

(58) Field of Classification Search
CPC ....... H04L 1/0618; H04L 1/06; H04L 1/0071; H04L 25/0204; H04B 7/0669
USPC .................................................. 375/259–315
See application file for complete search history.

(56) References Cited

U.S. PATENT DOCUMENTS 7,620,111 B2 * 11/2009 Palin .................... H04L 27/2626
375/260
7,746,944 B2 * 6/2010 Bacher .................. H04L 1/0003
375/265

(Continued)

OTHER PUBLICATIONS

Zhang, et al., "11ah Data Transmission Flow," doc.: IEEE 802.11-11/1484r1, Nov. 2011, 15 pages.

(Continued)

*Primary Examiner* — James M Perez
(74) *Attorney, Agent, or Firm* — Lee, Hong, Degerman, Kang & Waimey

(57) ABSTRACT

A method for transmitting a data unit, performed by a transmitting station, in a wireless local area network system is provided. The method includes generating a repeated bit sequence, generating an interleaved bit sequence by interleaving the repeated bit sequence, generating at least one symbol by modulating the interleaved bit sequence, generating at least one OFDM symbol by performing IDFT (Inverse Discrete Fourier Transform) on the at least one symbol and transmitting the at least one OFDM symbol.

11 Claims, 12 Drawing Sheets

(51) Int. Cl.
*H04L 1/06* (2006.01)
*H04L 1/08* (2006.01)
*H04W 84/12* (2009.01)

(52) U.S. Cl.
CPC ........... *H04L 27/2634* (2013.01); *H04W 84/12* (2013.01)

(56) References Cited

U.S. PATENT DOCUMENTS

| | | | |
|---|---|---|---|
| 7,757,155 | B2 | 7/2010 | Lim et al. |
| 2006/0156199 | A1* | 7/2006 | Palanki et al. ................ 714/776 |
| 2008/0069255 | A1 | 3/2008 | Balakrishnan et al. |
| 2008/0212693 | A1 | 9/2008 | Razzell |
| 2011/0026623 | A1 | 2/2011 | Srinivasa et al. |
| 2012/0324315 | A1* | 12/2012 | Zhang et al. ................... 714/776 |
| 2014/0369263 | A1* | 12/2014 | Vermani ............... H04W 28/06 370/328 |

OTHER PUBLICATIONS

PCT International Application No. PCT/KR2012/010679, Written Opinion of the International Searching Authority dated Mar. 12, 2013, 1 page.

\* cited by examiner

METHOD OF TRANSMITTING AND RECEIVING DATA UNIT IN WIRELESS LOCAL AREA NETWORK SYSTEM AND APPARATUS FOR THE SAME

CROSS-REFERENCE TO RELATED APPLICATIONS

This application is the National Stage filing under 35 U.S.C. 371 of International Application No. PCT/KR2012/010679, filed on Dec. 10, 2012, which claims the benefit of U.S. Provisional Application Ser. No. 61/568,171, filed on Dec. 8, 2011, the contents of which are hereby incorporated by reference herein in their entirety.

BACKGROUND OF THE INVENTION

1. Field of the Invention

The present invention relates to radio communication, and more specifically, to a method of transmitting and receiving a data unit in a wireless local area network system and an apparatus for the same.

2. Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

In contrast to the existing wireless local network area (WLAN) systems that supports HT (High Throughput) and VHT (Very High Throughput) and uses a bandwidth of 20/40/80/160/80+80 MHz at a band of 2 GHz and/or 5 GHz, WLAN systems have been suggested that may operate at a band of 1 GHz or less. When operating at a band not more than 1 GHz, a WLAN system uses a channel having a much narrower bandwidth than that of the existing WLAN systems, and thus, may have further expanded service coverage than that of the existing WLAN systems.

Meanwhile, a change in frequency band and bandwidth of a wireless channel to be used and a drastic increase in service coverage due to such change lead to a suggestion of a new data unit format and method of transmitting and receiving the data unit that may be used in a next-generation WLAN system.

SUMMARY OF THE INVENTION

An object of the present invention is to provide a method of transmitting and receiving a data unit in a WLAN system and an apparatus for the same.

In an aspect, a method for transmitting a data unit, performed by a transmitting station, in a wireless local area network system is provided. The method includes generating a repeated bit sequence, generating an interleaved bit sequence by interleaving the repeated bit sequence, generating at least one symbol by modulating the interleaved bit sequence, generating at least one OFDM symbol by performing IDFT (Inverse Discrete Fourier Transform) on the at least one symbol and transmitting the at least one OFDM symbol.

The repeated bit sequence may include a first data bit sequence transmitted to the transmission station and a second data bit sequence obtained by repeating the first data bit sequence.

The step of generating the interleaved bit sequence may include generating a first interleaved bit sequence by interleaving the first data bit sequence through an interleaver and generating a second interleaved bit sequence by interleaving the second data bit sequence through the interleaver.

The length of each of the first and second data bit sequences may be 24 bits. The interleaver may be a 24 points interleaver.

The step of generating the at least one symbol may include generating at least one first symbol by modulating the first interleaved bit sequence and generating at least one second symbol by modulating the second interleaved bit sequence.

The step of generating the data OFDM symbol may include generating a data OFDM symbol by performing the IDFT on the at least one first symbol and generating a repeated data OFDM symbol by performing the IDFT on the at least one second symbol. The at least one OFDM symbol may include the data OFDM symbol and the repeated data OFDM symbol.

The step of generating the interleaved bit sequence may include inserting a specific size of dummy bits to the first data bit sequence and the second data bit sequence, interleaving the repeated bit sequence inserted with the dummy bits through one interleaver and removing the dummy bits to generate the interleaved bit sequence.

The length of each of the first data bit sequence and the second data bit sequence may be 24 bits. The length of the dummy bits may be 2 bits. The one interleaver may be a 52 points interleaver.

The interleaved bit sequence may include a first interleaved bit sequence and a second interleaved bit sequence. The step of generating the at least one symbol may include generating at least one first symbol by modulating the first interleaved bit sequence and generating at least one second symbol by modulating the second interleaved bit sequence.

The step of generating the data OFDM symbol may include generating a data OFDM symbol by performing the IDFT on the at least one first symbol and generating a repeated data OFDM symbol by performing the IDFT on the at least one second symbol. The at least one OFDM symbol may include the data OFDM symbol and the repeated data OFDM symbol.

The encoding may be performed based on Binary Convolution Coding (BCC).

The modulation may be performed based on BPSK (Binary Phase Shift Keying).

In another aspect, a wireless apparatus operating in a wireless local area network system is provided. The wireless apparatus includes a transceiver configured to transmit and receive a wireless signal and a processor operatively coupled with the transceiver. The processor is configured to generate a repeated bit sequence, generate a interleaved bit sequence by interleaving the repeated bit sequence, generate at least one symbol by modulating the interleaved bit sequence, generate at least one OFDM symbol by performing IDFT (Inverse Discrete Fourier Transform) on the at least one symbol, and transmit the at least one OFDM symbol.

A format of a data unit which may be applicable to a next-generation WLAN system operating at a 1 MHz channel bandwidth at a sub 1 GHz frequency band and a method of generating and transmitting the data unit are provided. It may be possible to transmit and receive a data unit that fits for characteristics of a next-generation WLAN system with considerably expanded service coverage compared to existing WLAN systems by providing a method of transmitting and receiving a data unit based on OFDM (Orthogonal Frequency Division Multiplexing) symbol repetition.

DESCRIPTION OF EXEMPLARY EMBODIMENTS

Figure 1:
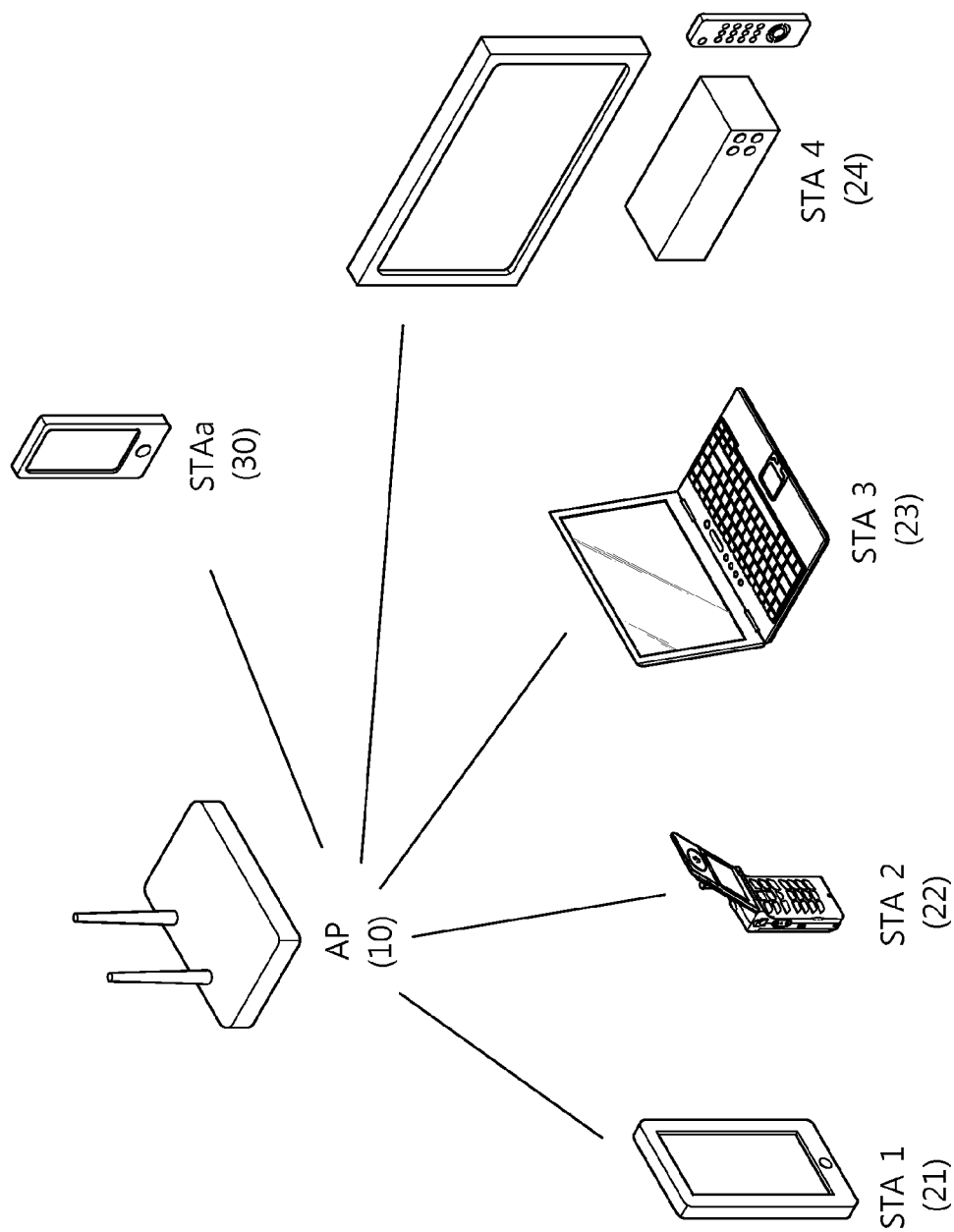
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1 21, STA2 22, STA3 23, STA2 24, and STAa 30, an AP (Access Point) 10 providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

The IEEE 802.11 MAC protocol, together with a Distributed Coordination Function (DCF), provides a Hybrid Coordination Function (HCF) based on a Point Coordination Function (PCF) of performing periodical polling by using the DCF and a polling-based synchronous access method so that all reception APs or STAs or both can receive data packets. The HCF includes contention-based Enhanced Distributed Channel Access (EDCA) and HCF Controlled Channel Access (HCCA) using a contention-free-based channel access scheme employing polling mechanism as access schemes used by a provider in order to provide data packets to a plurality of users. The HCF includes a medium access mechanism for improving Quality of Service (QoS) of a WLAN, and QoS data can be transmitted in both a Contention Period (CP) and a Contention-Free Period (CFP).

In a wireless communication system, an STA cannot know the existence of a network immediately when the STA is turned on and the STA starts operating from a viewpoint of a wireless medium. Accordingly, any type of an STA should perform a network discovery process in order to access a network. The STA that has discovered networks through the network discovery process selects a network to be joined through a network selection process. Next, the STA joins the selected network and performs a data exchange operation performed in a transmission terminal/reception terminal.

In a WLAN system, a network discovery process is embodied by a scanning procedure. The scanning procedure is divided into passive scanning and active scanning Passive scanning is performed based on a beacon frame that is periodically broadcasted by an AP. In general, in a WLAN, an AP broadcasts a beacon frame at a specific interval (e.g., 100 msec). The beacon frame includes information about a BSS managed by the beacon frame. An STA waits passively in order to receive the beacon frame in a specific channel. The STA obtains information about a network from the received beacon frame and then terminates the scanning procedure in the specific channel. Passive scanning is advantageous in that overall overhead is small because the passive scanning is performed if an STA has only to receive a beacon frame without a need to transmit an additional frame, but is disadvantageous in that the time taken to perform scanning is increased in proportion to the transmission period of a beacon frame.

In contract, in active scanning, an STA broadcasts a probe request frame actively in a specific channel and requests information about networks from all APs that have received the probe request frame. An AP that has received the probe request frame waists for a random time in order to prevent a collision between frames and transmits a probe response frame, including information about a network, to the STA. The STA receives the probe response frame, obtains the information about networks from the probe response frame, and then terminates the scanning procedure. Active scanning is advantageous in that scanning can be finished within a relatively short time, but is disadvantageous in that overall network overhead is increased because a frame sequence according to a request and a response is necessary.

The STA that has finished the scanning procedure selects a network according to its specific criterion and then, together with the AP, performs an authentication procedure. The authentication procedure is performed according to a 2-way handshake. The STA that has finished the authentication procedure, together with the AP, performs an association procedure.

The association procedure is performed according to a 2-way handshake. First, the STA transmits an association request frame to the AP. The association request frame includes information about the capabilities of the STA. The AP determines whether or not to permit association with the STA based on the information about the capabilities. The AP that has determined whether or not to permit association with the STA transmits an association response frame to the STA. The association response frame includes information indicating whether association has been permitted or not and information indicating a reason when association is permitted or failed. The association response frame further includes information about capabilities supportable by the AP. If the association is successfully completed, frames are normally exchanged between the AP and the STA. If the association is failed, the association procedure is attempted again based on information about a failure reason included in the association response frame or the STA may request association from another AP.

In order to overcome a limit to the communication speed that was considered as being weakness in a WLAN, IEEE 802.11n has been recently established as a technical standard. An object of IEEE 802.11n is to increase the speed and reliability of a network and to extend the coverage of a wireless network. More particularly, in order to support a High Throughput (HT) having a maximum data processing speed of 540 Mbps or higher, minimize an error in transmission, and optimize the data speed, IEEE 802.11n is based on Multiple Inputs and Multiple Outputs (MIMO) technology using multiple antennas on both sides of a transmitter and a receiver.

As a WLAN is actively propagated and applications employing the WLAN are diversified, there is a need for a new WLAN system that supports a throughput higher than the data processing speed supported by IEEE 802.11n. The next-generation WLAN system that supports a Very High Throughput (VHT) is a next version of an IEEE 802.11n WLAN system and is one of IEEE 802.11 WLAN systems which have recently been newly proposed in order to support a data processing speed of 1 Gbps or higher in a MAC Service Access Point (SAP).

Further to a conventional WLAN system that supports 20 MHz and 40 MHz, in a VHT WLAN system, transmission of bandwidth of 80 MHz, contiguous 160 MHz, and non-contiguous 160 MHz and/or transmission of bandwidth of no less than 160 MHz is to be supported. Further to the conventional wireless LAN system that supports up to 64 quadrature amplitude modulation (QAM), the VHT wireless LAN system supports 256QAM.

Since a multiuser-multiple input multiple output (MU-MIMO) transmitting method is supported in the VHT wireless LAN system for higher throughput, an AP may simultaneously transmit a data frame to at least one MIMO paired STA. The maximum number of paired STAs may be 4. When the maximum number of spatial streams is 8, up to 4 spatial streams may be allotted to the STAs.

Referring back to FIG. 1, in a WLAN system, such as that shown in FIG. 1, an AP 10 can transmit data to an STA group, including at least one of a plurality of STAs 21, 22, 23, 24, and 30 associated therewith, at the same time. An example where the AP performs MU-MIMO transmission to the STAs is shown in FIG. 1. In a WLAN system supporting Tunneled Direct Link Setup (TDLS), Direct Link Setup (DLS), or a mesh network, however, an STA trying to send data may send a PPDU to a plurality of STAs by using the MU-MIMO transmission scheme. An example where an AP sends a PPDU to a plurality of STAs according to the MU-MIMO transmission scheme is described below.

Data transmitted to the STAs may be transmitted through different spatial streams. A data packet transmitted by the AP 10 as a physical layer convergence procedure (PLCP) protocol data unit (PPDU) generated by a physical layer of the wireless LAN system to be transmitted or a data field included in the PPDU may be referred to as a frame. That is, a PPDU for single user (SU)-MIMO and/or MU-MIMO or the data field included in the PPDU may be referred to as an MIMO packet. A PPDU for MU may be referred to as an MU packet. In an example of the present invention, it is assumed that a group of STAs MU-MIMO paired with the AP 10 to be transmitted includes an STA1 21, an STA2 22, an STA3 23, and an STA4 24. At this time, spatial streams are not allotted to a specific STA of the group of STAs to be transmitted so that data may not be transmitted. On the other hand, it is assumed that an STAa 30 is combined with the AP, however, is not included in the group of STAs to be transmitted.

In order to support MU-MIMO transmission in a WLAN system, an identifier may be allocated to a target transmission STA group, and the identifier may be called a group ID. An AP transmits a group ID management frame, including group definition information, to STAs supporting MU-MIMO transmission in order to allocate a group ID to the STAs. The group ID is allocated to the STAs based on the group ID management frame prior to PPDU transmission. A plurality of group IDs may be allocated to one STA.

Table 1 below shows information elements included in the group ID management frame.

TABLE 1

| Order | Information |
|---|---|
| 1 | Category |
| 2 | VHT action |
| 3 | Membership status |
| 4 | Spatial stream position |

The category field and the VHT action field are set to identify that the frame corresponds to a management frame and a group ID management frame used in the next-generation WLAN system supporting MU-MIMO.

As in Table 1, group definition information includes the membership status information, indicating whether an STA belongs to a specific group ID, and spatial stream position information indicating that what place is the spatial stream set of a relevant STA located from all the spatial streams according to MU-MIMO transmission if the STA belongs to the relevant group ID.

Since a plurality of group IDs is managed by one AP, membership status information provided to one STA needs to indicate whether the STA belongs to each of the group IDs managed by the AP. Accordingly, the membership status information may exist in an array form of subfields, indicating whether the STA belongs to each group ID. The spatial stream position information may exist in an array form of subfields, indicating a position of a spatial stream set occupied by an STA regarding each group ID, because the spatial stream position information indicates a position for each group ID. Furthermore, the membership status information and the spatial stream position information for one group ID may be implemented within one subfield.

If an AP transmits a PPDU to a plurality of STAs according to the MU-MIMO transmission scheme, the AP includes information, indicating a group ID, in the PPDU, and transmits the information as control information. When an STA receives the PPDU, the STA checks whether it is a member STA of a target transmission STA group by checking a group ID field. If the STA is checked to be a member of the target transmission STA group, the STA may check that what place is a spatial stream set, transmitted thereto, placed from all the spatial streams. Since the PPDU includes information about the number of spatial streams allocated to a reception STA, the STA can receive data by searching for spatial streams allocated thereto.

On the other hand, a TV white space (WS) is spotlighted as a frequency band that may be newly used in the wireless LAN system. The TV WS refers to a frequency band in an idle state that is left due to digitalization of analog TVs of the United States, for example, 54-698 MHz band. However, the above is only an example. The TV WS may be referred to as a licensed band that may be priorly used by a licensed user. The licensed user means a user licensed to use the licensed band and may be referred to as a licensed device, a primary user, and an incumbent user.

The AP and/or the STA that operates in the TV WS must provide a function of protecting the licensed user, which is because the licensed user priorly uses the TV WS band. For example, when a specific WS channel that is a frequency band divided to have specific bandwidth in the TV WS by regulation is previously used by the licensed user such as a microphone, in order to protect the licensed user, the AP and/or the STA may not use the frequency band corresponding to the corresponding WS channel. In addition, when the frequency band that is currently used for transmitting and/or receiving a frame is used by the licensed user, the AP and/or the STA must stop using the corresponding frequency band.

Therefore, a procedure of the AP and/or the STA determining whether the specific frequency band in the TV WS band may be used, that is, whether the licensed user exists in the frequency band must be preceded. Determining whether the licensed user exists in the specific frequency band is referred to as spectrum sensing. An energy detection method and a signature detection method are used as a spectrum sensing mechanism. It may be determined that the licensed user is using the frequency band when the intensity of a received signal is no less than a predetermined value or when a digital TV (DTV) preamble is detected.

Figure 2:
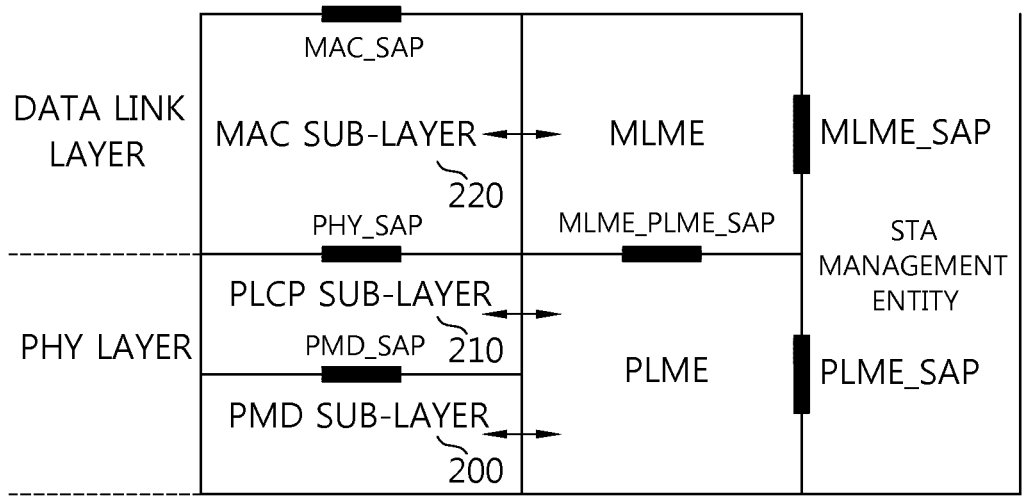
FIG. 2 shows a physical layer architecture of a WLAN system supported by IEEE 802.11.

FIG. 2 shows a physical layer architecture of a WLAN system supported by IEEE 802.11.

The IEEE 802.11 PHY architecture includes a PHY layer management entity (PLME), a physical layer convergence procedure (PLCP) sub-layer 210, and a physical medium dependent (PMD) sub-layer 200. The PLME provides a PHY management function in cooperation with a MAC layer management entity (MLME). The PLCP sub-layer 210 located between a MAC sub-layer 220 and the PMD sub-layer 200 delivers to the PMD sub-layer 200 a MAC protocol data unit (MPDU) received from the MAC sub-layer 220 under the instruction of the MAC layer, or delivers to the MAC sub-layer 220 a frame received from the PMD sub-layer 200. The PMD sub-layer 200 is a lower layer of the PDCP sub-layer and serves to enable transmission and reception of a PHY entity between two STAs through a radio medium. The MPDU delivered by the MAC sub-layer 220 is referred to as a physical service data unit (PSDU) in the PLCP sub-layer 210. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 210 attaches an additional field including information required by a PHY transceiver in a process of receiving the PSDU from the MAC sub-layer 220 and delivering the PSDU to the PMD sub-layer 200. The additional field attached to the PSDU in this case may be a PLCP preamble, a PLCP header, tail bits required to reset an convolution encoder to a zero state, etc. The PLCP sublayer 210 receives a TXVECTOR parameter, including control information necessary to generate and transmit a Physical Layer Convergence Procedure (PLCP) Protocol Data Unit (PPDU) and control information necessary for a receiving STA to receive and interpret the PPDU, from the MAC sub-layer 220. The PLCP sublayer 210 uses the information included in the TXVECTOR parameter in order to generate the PPDU including the PSDU.

The PLCP preamble serves to allow a receiver to prepare a synchronization function and antenna diversity before the PSDU is transmitted. In the PSDU, the data field may include padding bits, a service field including a bit sequence for initializing a scrambler, and a coded sequence obtained by encoding a bit sequence to which tail bits are attached. In this case, either binary convolutional coding (BCC) encoding or low density parity check (LDPC) encoding can be selected as an encoding scheme according to an encoding scheme supported in an STA that receives a PLCP protocol data unit (PPDU). The PLCP header includes a field that contains information on a PPDU to be transmitted, which will be described below in greater detail with reference to FIGS. 3 and 4.

The PLCP sub-layer 210 generates a PPDU by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data. The PLCP sublayer of the receiving STA transfers an RXVECTOR parameter, including control information included in a PLCP preamble and a PLCP header, to an MAC sublayer so that the MAC sublayer can interpret the PPDU and obtain data in a reception state.

Figure 3:
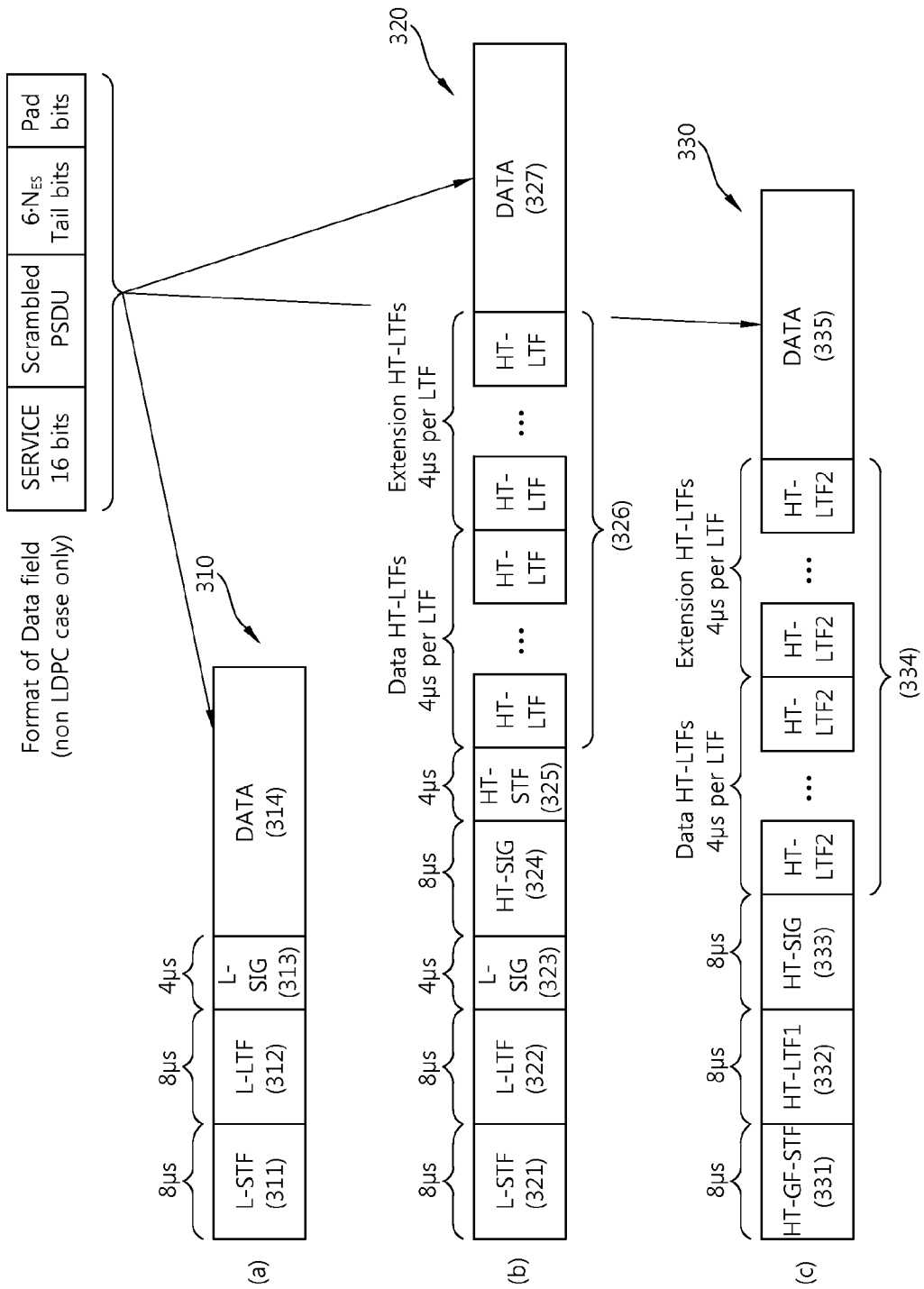
FIGS. 3 and 4 are block diagrams illustrating the format of the PPDU used in the wireless LAN system according to an embodiment of the present invention.
Figure 4:
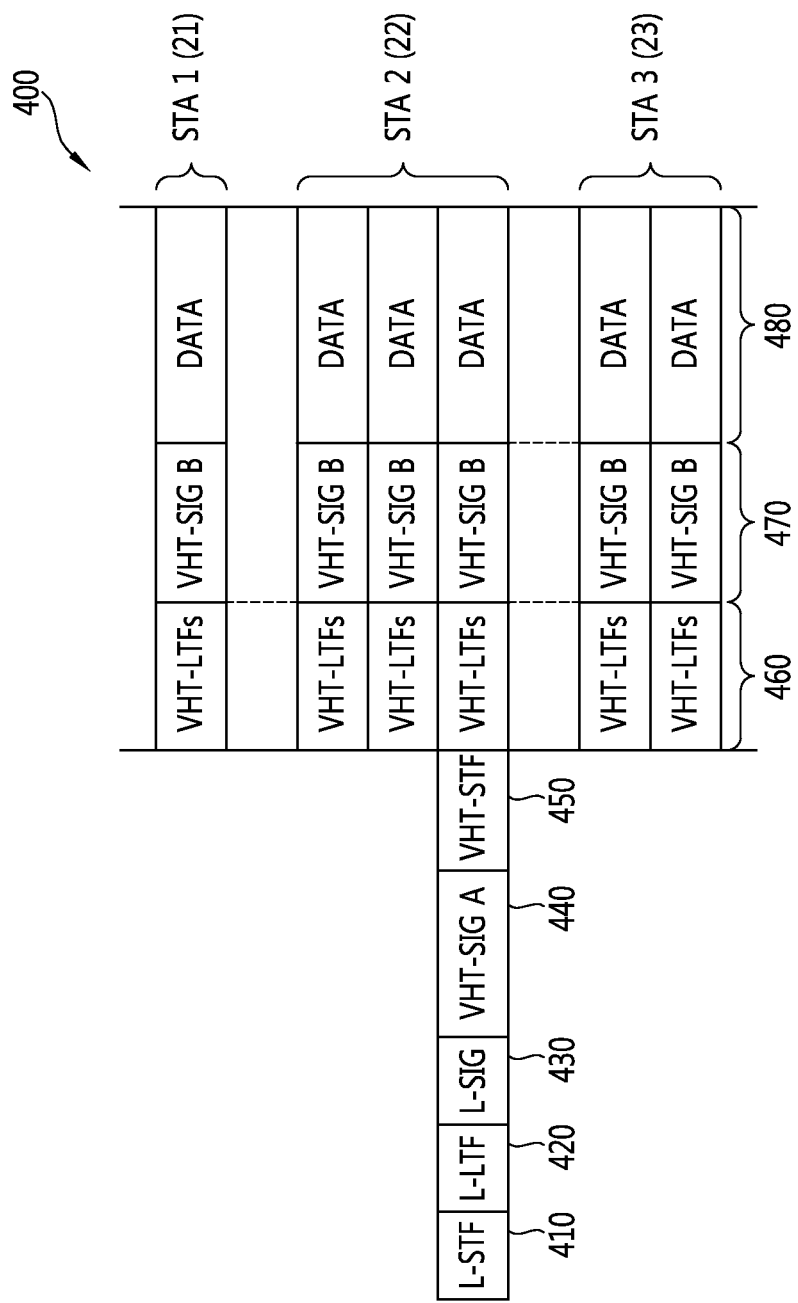

FIGS. 3 and 4 are block diagrams illustrating the format of the PPDU used in the wireless LAN system according to an embodiment of the present invention. Hereinafter, an STA that operates in a legacy wireless LAN system based on IEEE 802.11a/b/g that is an existing wireless LAN standard prior to IEEE 802.11n is referred to as a legacy STA (L-STA). In addition, an STA that may support high throughput (HT) in an HT wireless LAN system based on the IEEE 802.11n is referred to as an HT-STA.

FIG. 3(a) illustrates the format of a legacy PPDU (L-PPDU) that is used in the IEEE 802.11a/b/g that is the existing wireless LAN system standard prior to the IEEE 802.11n. Therefore, in the HT wireless LAN system to which the IEEE 802.11n standard is applied, the L-STA may transmit and receive the L-PPDU having the above format.

Referring to FIG. 3(a), an L-PPDU 310 includes an L-STF 411, an L-LTF 312, an L-SIG field 313, and a data field 314.

The L-STF 311 is used for frame timing acquisition, automatic gain control (AGC) convergence, coarse frequency acquisition, etc.

The L-LTF 312 is used for frequency offset and channel estimation.

The L-SIG field 313 includes control information for demodulation and decoding of the data field 314.

The L-PPDU may be transmitted in the order of the L-STF 311, the L-LTF 312, the L-SIG field 313, and the data field 314.

FIG. 3(b) is a diagram showing an HT-mixed PPDU format in which an L-STA and an HT-STA can coexist. An HT-mixed PPDU 320 includes an L-STF 321, an L-LTF 322, an L-SIG field 323, an HT-SIG field 324, an HT-STF 325, a plurality of HT-LTF 326, and a data field 327.

The L-STF 321, the L-LTF 322, and the L-SIG field 323 are identical to those shown in FIG. 3(a). Therefore, the L-STA can interpret the data field by using the L-STF 321, the L-LTF 322, and the L-SIG field 323 even if the HT-mixed PPDU 320 is received. The L-LTF 322 may further include information for channel estimation to be performed by the HT-STA in order to receive the HT-mixed PPDU 320 and to interpret the L-SIG field 323, the HT-SIG field 324, and the HT-STF 325.

The HT-STA can know that the HT-mixed PPDU 320 is a PPDU dedicated to the HT-STA by using the HT-SIG field 324 located next to the L-SIG field 323, and thus can demodulate and decode the data field 327.

The HT-STF 325 may be used for frame timing synchronization, AGC convergence, etc., for the HT-STA.

The HT-LTF 326 may be used for channel estimation for demodulation of the data field 327. Since the IEEE 802.11n supports single user-MIMO (SU-MIMO), a plurality of the HT-LTF 326 may be configured for channel estimation for each of data fields transmitted through a plurality of spatial streams.

The HT-LTF 326 may consist of a data HT-LTF used for channel estimation for a spatial stream and an extension HT-LTF additionally used for full channel sounding. Therefore, the number of the plurality of HT-LTF 326 may be equal to or greater than the number of spatial streams to be transmitted.

The L-STF 321, the L-LTF 322, and the L-SIG field 323 are transmitted first so that the L-STA also can acquire data by receiving the HT-mixed PPDU 320. Thereafter, the HT-SIG field 324 is transmitted for demodulation and decoding of data transmitted for the HT-STA.

Up to fields located before the HT-SIG field 324, transmission is performed without beamforming so that the L-STA and the HT-STA can acquire data by receiving a corresponding PPDU. In the subsequently fields, i.e., the HT-STF 325, the HT-LTF 326, and the data field 327, radio signal transmission is performed by using precoding. In this case, the HT-STF 325 is transmitted so that an STA that receives a precoded signal can consider a varying part caused by the precoding, and thereafter the plurality of HT-LTF 326 and the data field 327 are transmitted.

Even if an HT-STA that uses 20 MHz in an HT WLAN system uses 52 data subcarriers per OFDM symbol, an L-STA that also uses 20 MHz uses 48 data subcarriers per OFDM symbol. Since the HT-SIG field 324 is decoded by using the L-LTF 322 in a format of the HT-mixed PPDU 320 to support backward compatibility, the HT-SIG field 324 consists of 48×2 data subcarriers. The HT-STF 325 and the HT-LTF 326 consist of 52 data subcarriers per OFDM symbol. As a result, the HT-SIG field 324 is supported using ½ binary phase shift keying (BPSK), each HT-SIG field 424 consists of 24 bits, and thus 48 bits are transmitted in total. That is, channel estimation for the L-SIG field 323 and the HT-SIG field 324 is performed using the L-LTF 322, and a bit sequence constituting the L-LTF 322 can be expressed by Equation 1 below. The L-LTF 322 consists of 48 data subcarriers per one symbol, except for a DC subcarrier.

$$L_{-26,26}\{1,1,-1,1,1,-1,1,-1,1,1,1,1,1,1,-1,-1,1,1,-1,\\ 1,-1,1,1,1,0,1,-1,-1,1,1,-1,1,1,1,1,1,1,-1,-1,1,\\ 1,-1,-1,1,-1,1,-1,1,1,1,1\} \quad \text{[Equation 1]}$$

FIG. 3(c) is a diagram showing a format of an HT-Greenfield PPDU 330 that can be used by only an HT-STA. The HT-GF PPDU 330 includes an HT-GF-STF 331, an HT-LTF1 332, an HT-SIG field 333, a plurality of HT-LTF2 334, and a data field 335.

The HT-GF-STF 331 is used for frame timing acquisition and AGC.

The HT-LTF1 332 is used for channel estimation.

The HT-SIG field 333 is used for demodulation and decoding of the data field 335.

The HT-LTF2 334 is used for channel estimation for demodulation of the data field 335. Since the HT-STA uses SU-MIMO, channel estimation is required for each of data fields transmitted through a plurality of spatial streams, and thus a plurality of HT-LTF2 334 may be configured.

The plurality of HT-LTF2 334 may consist of a plurality of data HT-LTFs and a plurality of extension HT-LTFs, similarly to the HT-LTF 326 of the HT-mixed PPDU 320.

Data fields 314, 327, and 335 illustrated in FIG. (a), (b), and (c) may include a service field, a scrambled PLCP service data unit (PSDU), a tail bit, and a padding bit, respectively. The service field may be used for initializing a scrambler. The service field may be configured by 16 bits. In this case, bits for initializing the scrambler may be realized by 7 bits. The tail field may be configured by a bit sequence required for returning a convolution encoder to a zero state. A bit size proportional to the number of binary convolutional code (BCC) encoders used for encoding data to be transmitted may be allotted to the tail field. In detail, the tail field may be realized to have 6 bits by the number of BCCs.

FIG. 4 shows an example of a PPDU format used in the WLAN system supporting very high throughput (VHT).

Referring to FIG. 4, a PPDU 400 includes an L-STF 410, an L-LTF 420, an L-SIG field 430, a VHT-SIGA field 440, a VHT-STF 450, a VHT-LTF 460, a VHT-SIGB field 470, and a data field 480.

A PLCP sub-layer constituting a PHY converts a PSDU delivered from a MAC layer into the data field 480 by appending necessary information to the PSDU, generates the PPDU 400 by appending several fields such as the L-STF 410, the L-LTF 420, the L-SIG field 430, the VHT-SIGA field 440, the VHT-STF 450, the VHT-LTF 460, the VHT-SIGB field 470, or the like, to the data field and delivers the PPDU 400 to one or more STAs through a physical medium dependent (PMD) sub-layer constituting the PHY. Control information required by the PLCP sub-layer to generate the PPDU and control information used by a reception STA to interpret the PPDU and transmitted by being included in the PPDU are provided from a TXVECTOR parameter delivered from the MAC layer.

The L-SFT 410 is used for frame timing acquisition, automatic gain control (AGC) convergence, coarse frequency acquisition, etc.

The L-LTF 420 is used for channel estimation for demodulation of the L-SIG field 430 and the VHT-SIGA field 440.

The L-SIG field 430 is used when the L-STA receives the PPDU 400 and interprets it to acquire data. The L-SIG field 430 includes a rate sub-field, a length sub-field, a parity bit and tail field. The rate sub-field is set to a value indicating a bit state for data to be currently transmitted.

The length sub-field is set to a value indicating an octet length of a PSDU to be transmitted by the PHY layer at the request of the MAC layer. In this case, an L_LENGTH parameter which is a parameter related to information indicating the octet length of the PSDU is determined based on a TXTIME parameter which is a parameter related to a transmission time. TXTIME indicates a transmission time determined for PPDU transmission including the PSDU by the PHY layer in association with a transmission time requested for transmission of the PSDU. Therefore, since the L_LENGTH parameter is a time-related parameter, the length sub-field included in the L-SIG field 430 includes information related to the transmission time.

The VHT-SIGA field 440 includes control information (or signal information) required by STAs for receiving the PPDU to interpret the PPDU 400. The VHT-SIGA 440 is transmitted on two OFDM symbols. Accordingly, the VHT-SIGA field 440 can be divided into a VHT-SIGA1 field and a VHT-SIGA2 field. The VHT-SIGA1 field includes channel bandwidth information used for PPDU transmission, identifier information related to whether space time block coding (STBC) is used, information indicating either SU or MU-MIMO as a PPDU transmission scheme, and, if the transmission scheme is MU-MIMO, information indicating a transmission target STA group of a plurality of STAs which are MU-MIMO paired with the AP, and information regarding a spatial stream allocated to each STA included in the transmission target STA group. The VHT-SIGA2 field includes short guard interval (SGI) information.

The information indicating the MIMO transmission scheme and the information indicating the transmission target STA group can be implemented as one piece of MIMO indication information, and for example, can be implemented as a group ID. The group ID can be set to a value having a specific range. A specific value in the range indicates an SU-MIMO transmission scheme, and other values can be used as an identifier for a corresponding transmission target STA group when the MU-MIMO transmission scheme is used to transmit the PPDU 400.

When the group ID indicates that the PPDU 400 is transmitted using the SU-MIMO transmission scheme, the VHT-SIGA2 field includes coding indication information indicating whether a coding scheme applied to the data field is binary convolution coding (BCC) or low density parity check (LDPC) coding and modulation coding scheme (MCS) information regarding a channel between a transmitter and a receiver. In addition, the VHT-SIGA2 field can include an AID of a transmission target STA of the PPDU and/or a partial AID including a part of bit-sequence of the AID.

When the group ID indicates that the PPDU 400 is transmitted using the MU-MIMO transmission scheme, the VHT-SIGA field 400 includes coding indication information indicating whether a coding scheme applied to the data field which is intended to be transmitted to MU-MIMO paired reception STAs is BCC or LDPC coding. In this case, MCS information for each reception STA can be included in the VHT-SIGB field 470.

The VHT-STF 450 is used to improve performance of AGC estimation in MIMO transmission.

The VHT-LTF 460 is used when the STA estimates a MIMO channel. Since the next generation WLAN system supports MU-MIMO, the VHT-LTF 460 can be configured by the number of spatial streams in which the PPDU 400 is transmitted. In addition, when full channel sounding is supported and is performed, the number of VHT-LTFs may increase.

The VHT-SIGB field 470 includes dedicated control information required when the plurality of MIMO-paired STAs receive the PPDU 400 to acquire data. Therefore, the STA may be designed such that the VHT-SIGB field 470 is decoded only when the control information included in the VHT-SIGA field 440 indicates that the currently received PPDU 400 is transmitted using MU-MIMO transmission. On the contrary, the STA may be designed such that the VHT-SIGB field 470 is not decoded when the control information in the VHT-SIGA field 440 indicates that the currently received PPDU 400 is for a single STA (including SU-MIMO).

The VHT-SIGB field 470 may include MCS information and rate-matching information for each STA. Further, the VHT-SIGB field 470 may include information indicating a PSDU length included in the data field for each STA. The information indicating the PSDU length is information indicating a length of a bit-sequence of the PSDU and can be indicated in the unit of octet. Meanwhile, when the PPDU is transmitted based on single user transmission, the information about the MCS may not be included in the VHT-SIGB field 470, because that is included in the VHT-SIGA field 440. A size of the VHT-SIGB field 470 may differ according to the MIMO transmission method (MU-MIMO or SU-MIMO) and a channel bandwidth used for PPDU transmission.

The data field 480 includes data intended to be transmitted to the STA. The data field 480 includes a PLCP service data unit (PSDU) to which a MAC protocol data unit (MPDU) of a MAC layer is delivered, a service field for initializing a scrambler, a tail field including a bit sequence required to reset a convolution encoder to a zero state, and padding bits for normalizing a length of the data field. In case of MU transmission, each data unit intended to be respectively transmitted to each STA may be included in the data field 580. The data unit may be aggregate MPDU (A-MPDU).

The fields included in each PPDU format, as shown in FIGS. 3 and 4, may be transmitted as OFDM symbols by processing at the physical layer. In particular, the data sequence constituting the data field may be transmitted as at least one or more data OFDM symbols depending on its size.

Further, normal generation, transmission, reception, and interpretation of data OFDM symbols may be hampered due to a wireless channel state, inconsistency in time synchronization between a transmitter and a receiver, and inter-symbol interference. To prevent this, a guard interval (GI) may be applied to the data OFDM symbol, thus resulting in a possible abnormal operation being prevented and high-reliability data unit transmission/reception being guaranteed. Further, an SGI is applicable to an HT WLAN system and VHT WLAN system to reduce time consumed due to the guard interval, thereby guaranteeing more efficient transmission and reception. In the HT WLAN system and VHT WLAN system, it may be indicated whether SGI is applicable to the signal field and VHT-SIG A field.

In a WLAN system as shown in FIG. 1, when an AP 10 attempts to transmit data to a STA1 21, an STA2 22, and a STA3 23, the AP 10 may transmit a PPDU to an STA group that includes the STA1 21, the STA2 22, the STA3 23, and a STA4 24. In such case, as shown in FIG. 4, no spatial stream may be assigned to the STA4 24, while a specific number of spatial streams are assigned to each of the STA1 21, STA2 22, and STA3 23, thereby resulting in data transmission. In the example illustrated in FIG. 4, one spatial stream, three spatial streams, and two spatial streams are assigned to the STA1 21, the STA2 22, and the STA3 23, respectively.

Meanwhile, as various communication services, such as smart grid, e-Health, or ubiquitous services, appear on, M2M (Machine to Machine) technologies to support such communication services draw attention. A sensor for sensing temperature or humidity, a camera, a home appliance, such as TVs, a process machine used in a factory, or large-size machines, such as vehicles, may be an element that constitutes an M2M system. Elements constituting the M2M system may perform data transmission and reception based on WLAN communication. In case devices constituting an M2M system establish a network while supporting WLAN, this is hereinafter referred to as an M2M WLAN system.

An M2M-supportive WLAN system has the following characteristics:

1) great number of STAs: M2M assumes, in contrast to existing networks, that a number of STAs are present in BSS. This is why sensors installed in a home or company as well as a device owned by an individual is considered. Accordingly, a considerable number of STAs may be connected to one AP.

2) low traffic load per STA: because an M2M terminal has a traffic pattern that collects and reports surrounding information, the information may be not frequently sent and the amount of the information is small.

3) uplink-centered communication: M2M has a structure of primarily receiving a command on downlink, taking actions, and then reporting a result on uplink. Since main data is generally transmitted on uplink, an M2M supportive system is centered on the uplink.

4) power management of STA: an M2M terminal is primarily battery-powered and in many cases, is difficult for a user to frequently recharge. Accordingly, a power management scheme is required to minimize battery consumption.

5) automatic restoration function: since it is hard for a user to directly manipulate a device constituting an M2M system in a specific situation, an automatic restoration function is needed.

A next-generation WLAN system standard taking M2M communication as a use example is now in discussion. A prominent feature of such WLAN system is to have service coverage that reaches a radius of 1 km or more at a non-licensed sub 1 GHz band except for TV WS band, which means that it has fairly expanded service coverage compared with existing indoor-centered WLANs. That is, in case a WLAN operates at 1 GHz or less that is represented as 700 to 900 MHz in contrast to existing 2.4 GHz and 5 GHz, the propagation characteristics at the corresponding band may result in the service coverage of an AP being expanded further by 2 or 3 times respective of the same transmission power. In such case, it features that a great number of STAs may be connected to each AP. Use examples considered in the next-generation WLAN may be as follow:

Use Example 1

Sensors and Meters

1a: smart grid-meter to pole
1c: Environmental/Agricultural Monitoring
1d: Industrial process sensors
1e: Healthcare
1f: Healthcare
1g: Home/Building Automation
1h: Home sensors Use Example 2

Backhaul Sensor and Meter Data

Backhaul aggregation of sensors
Backhaul aggregation of industrial sensors

Use Example 3

Extended Range Wi-Fi

Outdoor extended range hotspot
Outdoor Wi-Fi for cellular traffic offloading

The sensors and meters in the above use example 1 are the above-described M2M-related use examples, and various types of sensor devices may be connected to an AP in a WLAN system to perform M2M communication. In particular, in the case of smart grind, up to 6000 sensor devices may be connected to one AP.

In the case the backhaul sensor and data meter in the use example 2, an AP providing broad coverage functions as a backhaul link of another communication system.

The use example 3 aims to provide outdoor extended range hotspot communication, such as extended home service coverage, campus service coverage, or shopping mall coverage, or aims to distribute overload cellular traffic by the AP offloading traffic of cellular mobile communication.

The present invention suggests a format of a data unit for a device that operates at 1 GHz or less as discussed in the next-generation WLAN standards. More specifically, there is suggested an effective physical layer preamble structure for a device that operates at sub 1 GHz band. The data units provided hereinafter, that is, PPDUs, may be sequentially transmitted depending on the order in which the fields are included in the form of OFDM symbols.

A sub 1 GHz band communication provides much broader service coverage than in the existing indoor-centered WLAN systems in terms of propagation characteristics. For this, the characteristics of the physical layer (PHY) in the existing VHT WLAN system may be realized to be $\frac{1}{10}$ down clocked. In such case, in the VHT WLAN system, 20/40/80/160/80+80 MHz channel bandwidth is provided as 2/4/8/16/8+8 MHz channel bandwidth at sub 1 Hz band by such $\frac{1}{10}$ down clocking. Accordingly, the guard interval (GI) is increased by 10 times from existing 0.8 us to 8us. The following Table 2 shows a comparison in performance between the physical layer in the VHT WLAN system and the physical layer in a WLAN system based on the down-clocked 1 GH or less bandwidth.

TABLE 2

| PHY of VHT WLAN system | | PHY of WLAN system based on 1/10 down-clocked 1 GHz or less bandwidth | |
|---|---|---|---|
| Channel bandwidth | Throughput | Channel bandwidth | Throughput |
| 20 MHz | 86.7 Mbps | 2 MHz | 8.67 Mbps |
| 40 MHz | 200 Mbps | 4 MHz | 20 Mbps |
| 80 MHz | 433.3 Mbps | 8 MHz | 43.33 Mbps |
| 160 MHz | 866.7 Mbps | 16 MHz | 86.67 Mbps |
| 80 + 80 MHz | 866.6 Mbps | 8 + 8 MHz | 86.66 Mbps |

Hereinafter, for ease of description, assuming that the PHY characteristics of the VHT WLAN system are 1/10 down clocked, an example is described in which duration of one OFDM symbol is 40 us. However, the embodiments of the present invention are not limited to the specific numerical values.

Since a conventionally considered legacy device operating in sub 1 GHz band is not present, it may be critical to design the PHY preamble to be applicable to 1 GHz or less bandwidth as effective as possible without consideration of backward compatibility. Considering this, a PPDU format as shown in FIG. 5 is suggested.

Figure 5:
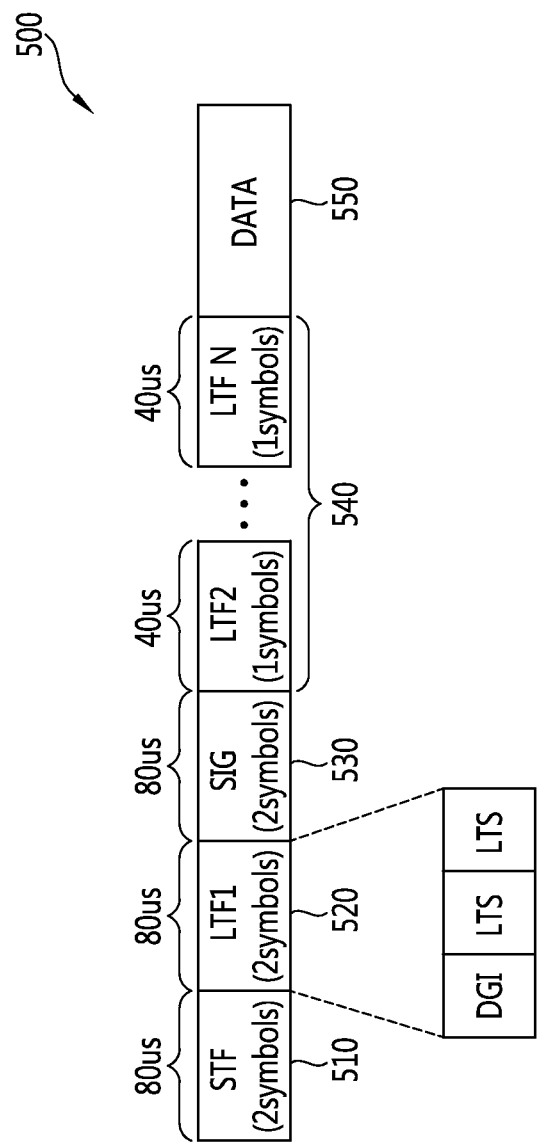
FIG. 5 is a block diagram illustrating an example of a PPDU format transmitted in sub 1 GHz band according to an embodiment of the present invention.

FIG. 5 is a block diagram illustrating an example of a PPDU format transmitted in sub 1 GHz band according to an embodiment of the present invention.

Referring to FIG. 5, the PPDU 500 has a structure in which HT-GF PPDU format as shown in FIG. 3(c) is down clocked by 1/10. The PPDU 500 includes an STF 510, an LTF1 520, an SIG field 530, at least one LTF2 540 and a data field 550.

The STF 510 is used for obtaining frame timing and AGC. The STF 510 consists of two OFDM symbols each of which is 40 us, totaling an OFDM symbol duration of 80 us.

The LTF1 520 is used for channel estimation. The LTF1 520 consists of two OFDM symbols, each of which is 40 us, totaling OFDM symbol duration of 80 us. LTF1 includes a DGI (Double Guard Interval) and two LTSs (Long Training Symbols).

The SIG 530 is used for demodulation and decoding of the data field 540. The SIG field 530 consists of two OFDM symbols, each of which is 40 us, totaling OFDM symbol duration of 80 us.

At least one LTF 540 is used for channel estimation for demodulating the data field 550. Each LTF consists of one OFDM symbol and has OFDM symbol duration of 40 us.

In case a PPDU having the format shown in FIG. 5 is transmitted, total 160 us is required to transmit the SIG field 530. Such format of PPDU may be used to transmit a channel bandwidth of 2 MHz or more.

Figure 6:
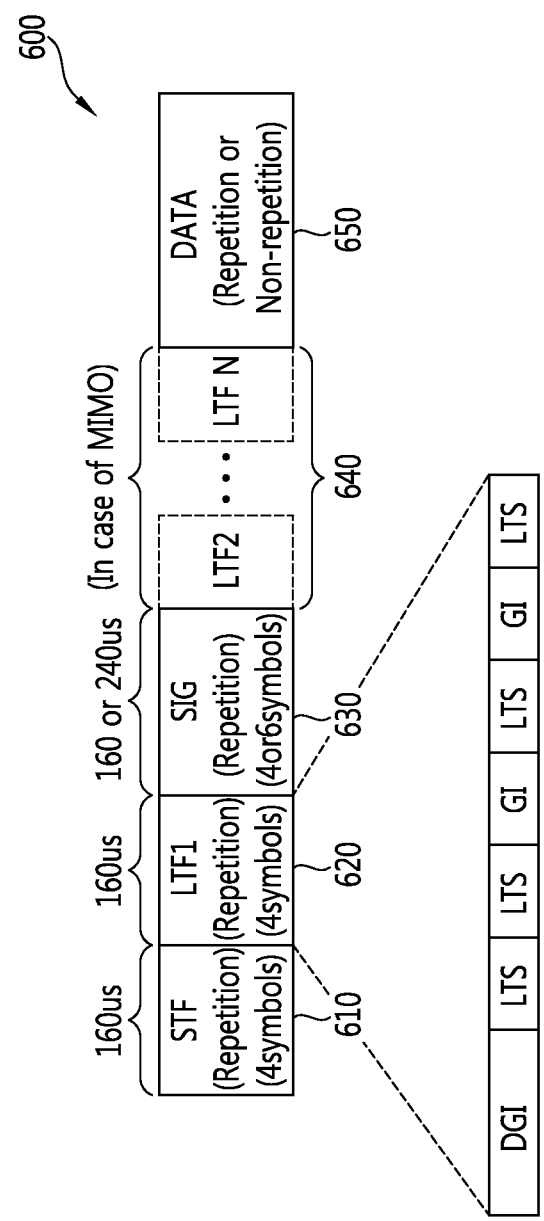
FIG. 6 is a block diagram illustrating an example of a PPDU format for 1 MHz bandwidth transmission is sub 1 GHz band according to an embodiment of the present invention.

Meanwhile, for communication of extended coverage, a PPDU format as shown in FIG. 6 may be suggested in which OFDM symbol repetition applies which repeats each STF, LTF, SIG, and/or data field included in the PPDU over twice or more time or frequency axis.

FIG. 6 is a block diagram illustrating an example of a PPDU format for 1 MHz bandwidth transmission is sub 1 GHz band according to an embodiment of the present invention.

Referring to FIG. 6, the PPDU 600 may include an STF 610, an LTF1 620, an SIG field 630, and a data field 650. Additionally, depending on the number of spatial streams used in the case of PPDU for MIMO transmission, at least one or more LTFs (LTF2 to LTF N, 640) may be added.

Referring to the STF 610 and the LTF1 620, OFDM symbols are repeatedly formed in contrast to the STF 510 and the LTF1 520 described above in connection with FIG. 5. That is, each OFDM symbol(s) is repeated that consists of bit sequences originally constituted of STF and LTF1.

Accordingly, the STF 610 consists of four OFDM symbols, each of which is 40 us, totaling OFDM symbol duration of 160 us. The LTF1 620 also consists of four OFDM symbols, each of which is 40 us, totaling OFDM symbol duration of 160 us. That is, in case the PPDU shown in FIG. 6 is provided, transmission time of the preamble is 320 us, which is two times as long as the transmission time of the PPDU having the format shown in FIG. 5.

Meanwhile, when the LTF1 620 is seen from the time domain, one LTF1 symbol includes a DGI and two LTSs, and thus, when simply repeated, may be constituted of the DGI, two LTSs, DGI, and two LTSs in the order thereof. However, the repeated LTF symbols may be realized in the form of applying two GIs instead of the DGI. Accordingly, the LTF1 symbol may be realized, as shown, to include the DGI, two LTSs, GI, LTS, GI, and LTS.

The SIG field 630 may also include repeated formed OFDM symbols and two or more OFDM symbols for the sig field 630 may be repeated.

When the PPDU is transmitted through a plurality of spatial streams according to MIMO transmission, at least one LTF 640 and data field 650 that may be included in the PPDU 600 may not include repetition of the OFDM symbols.

The PPDU format to which repetition of OFDM symbols applies may be used for frame transmission and reception for further broadened service coverage by using 1 MHz channel bandwidth.

Meanwhile, the above-described PPDU format for 1 MHz bandwidth transmission may need information that may signal whether OFDM symbol repetition applies to the LTF2 to LTF N for MIMO transmission. For this purpose, the MCS subfield of the SIG field may be set to indicate whether the OFDM symbol repetition applies.

Hereinafter, for ease of description, a lowest MCS level with no repetition is assumed as MCS 1, and a highest MCS level is assumed as MCS 8. At this time, the OFDM symbol set as MCS1 is subjected to OFDM symbol repetition that repeats an OFDM symbol on a time axis or frequency axis, so that a one-step lowered MCS is generated, which is referred to as MCS 0. Total MCS levels have 9 steps from MCS 0 to MCS 8. Only in the case MCS 0, OFDM symbol repetition applies so that the length of all the symbols substantially doubles. If the above-described PPDU for 1 MHz bandwidth transmission applies, OFDM symbol repetition applies up to the STF, LTF1 and SIG fields of the PPDU which are then transmitted. On the contrary, at least one LTF (LTF2 to LTF N) and data field included in case of MIMO transmission may not be subjected to OFDM symbol repetition as described above. Whether the OFDM symbol repetition applies may be indicated by an MCS level. That is, if the MCS subfield of the SIG field indicates MSC0, OFDM symbol repetition is applicable to LTF2 to LTF N and data field as well, and if the MCS subfield of the SIG field indicates other MCS levels, each LTF is transmitted as one OFDM symbol, and the data field may be also transmitted as at least one or more data OFDM symbols without symbol repetition.

Figure 7:
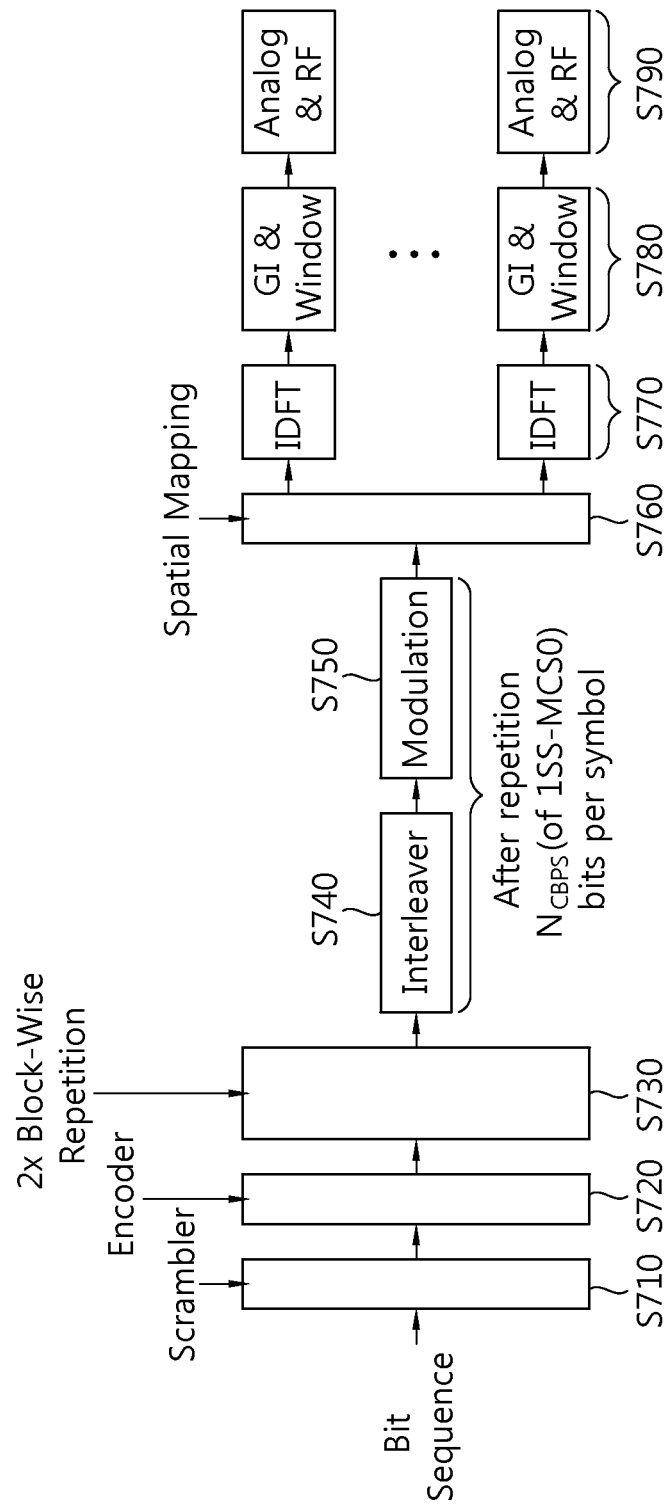
FIG. 7 is a view illustrating an example of a transmission method by a transmission STA according to an embodiment of the present invention.

Meanwhile, in case OFDM symbol repetition applies by using the lowest MCS level, i.e., MCS0, upon 1 MHz transmission at sub 1 GHz band, a transmission flow may refer to FIG. 7.

FIG. 7 is a view illustrating an example of a transmission method by a transmission STA according to an embodiment of the present invention.

Referring to FIG. 7, the transmission STA scrambles a bit sequence to be transmitted based on a specific scrambling sequence (S710).

The scrambled bit sequence is encoded to generate an encoded bit sequence (S720). FEC (Forward Error Correction) coding may apply as an encoding scheme, and a BCC (Binary Convolution Code) encoding scheme may be used as the FEC coding. Meanwhile, in case such encoding is done, tail bits may be added to the encoded bit sequence.

The encoded bit sequence is subjected to 2× block-wise repetition to thereby generate a repeated bit sequence (S730). Meanwhile, in case FEC coding-based encoded bit sequence is repeated, the added tail bits are also repeated due to encoding.

The repeated bit sequence is interleaved through an interleaver (S740), and the interleaved bit sequence is modulated to thereby generate symbols (S750). As a modulation scheme, a BPSK (Binary Phase Shift Keying) scheme may be used. Meanwhile, each symbol generated after modulation has the number of bits (NCBPS) defined in the case of MCS 0 as the MCS level and transmission through one spatial stream.

Symbols modulated in the case of MIMO transmission are mapped to the spatial stream (S760), and the mapped signal is subjected to IDFT (Inverse Discrete Fourier Transform) and is thereby generated as an OFDM symbol (S770), to which an inter-OFDM symbol guard interval (GI) is then inserted (S780), and is then transmitted (S790). Meanwhile, in the case of non-MIMO transmission, modulated symbols are immediately subjected to IDFT and are thereby generated as OFDM symbols, and inter-symbol GI is inserted into the OFDM symbols that are then transmitted.

Meanwhile, in the above-described transmission method according to FIG. 7, since a repeated bit sequence is generated by applying 2× block-wise repetition after FEC encoding-based encoding is done, tail bits may be repeated in terms of the overall sequence. Accordingly, 2× block-wise repetition may be performed before the encoding step in order to prevent consumption of bits due to repetition of the tail bits.

Figure 8:
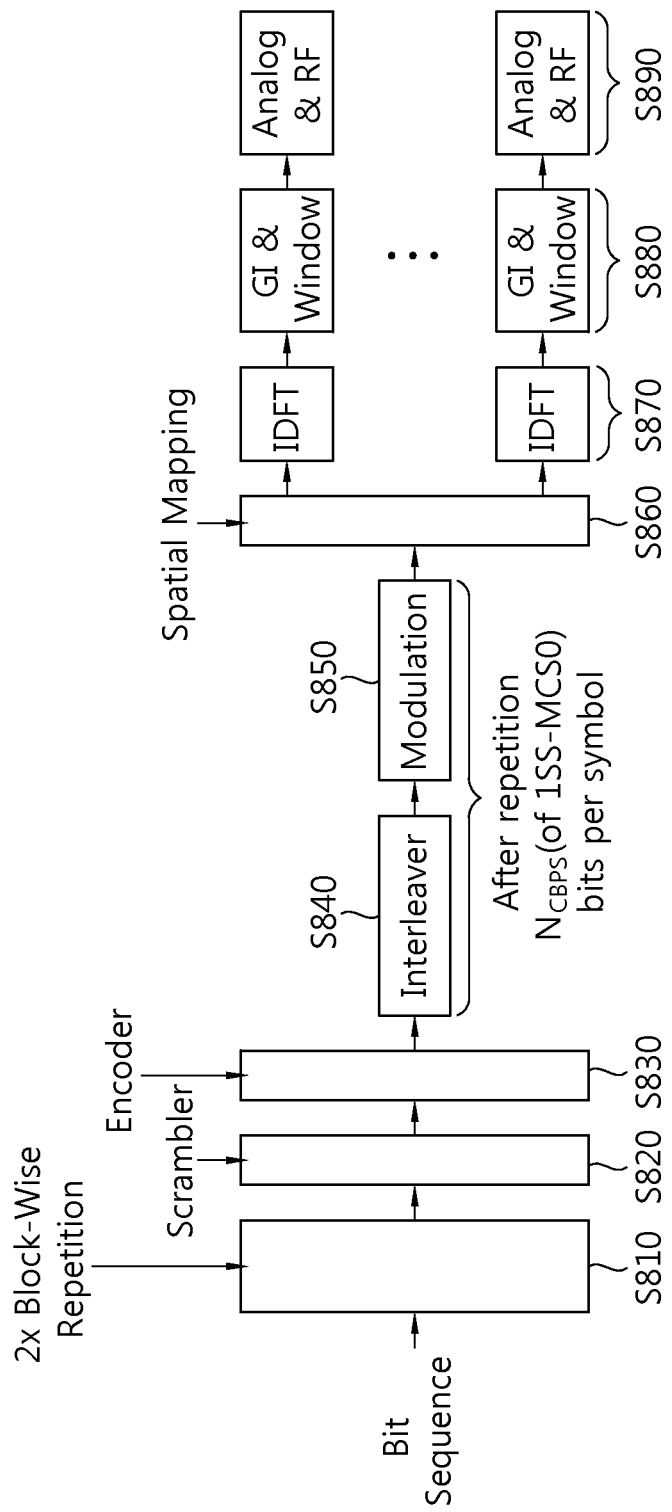
FIG. 8 is a view illustrating another example of a transmission method by a transmission STA according to an embodiment of the present invention.

FIG. 8 is a view illustrating another example of a transmission method by a transmission STA according to an embodiment of the present invention.

Referring to FIG. 8, the transmission STA applies 2× block-wise repetition to a bit sequence to be transmitted, thereby generating a repeated bit sequence (S810).

The repeated bit sequence is scrambled based on a specific scrambling sequence to thereby generate a scrambled bit sequence (S820).

The scrambled bit sequence is encoded to generate an encoded bit sequence (S830). In the example shown in FIG. 8, the bit sequence to be transmitted has already undergone 2× block-wise repetition and is encoded later, and thus, the tail bits are not repeated by encoding but are present only at last. Accordingly, compared to the example shown in FIG. 7, as many bits as the number of tail bits may be saved, and the saved length of bits may be used to implement other types of information.

Transmission steps S840 to S890 after encoding are the same as steps S740 to S790 of FIG. 7, and the detailed description is not repeated.

Figure 9:
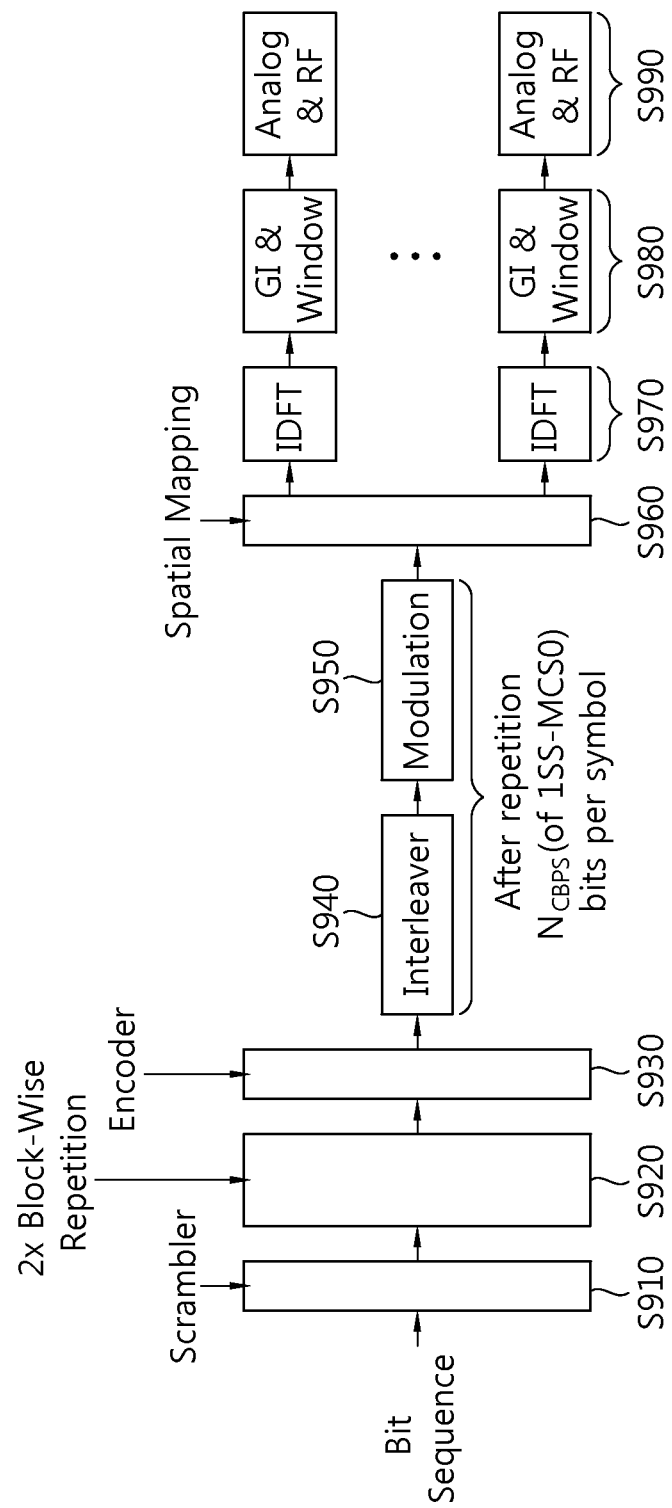
FIG. 9 is a view illustrating another example of a transmission method by a transmission STA according to an embodiment of the present invention.

FIG. 9 is a view illustrating another example of a transmission method by a transmission STA according to an embodiment of the present invention.

Referring to FIG. 9, the transmission STA scrambles a bit sequence to be transmitted based on a specific scrambling sequence to thereby generate a scrambled bit sequence (S910).

The scrambled bit sequence is subjected to 2× block-wise repetition to generate a repeated bit sequence (S920).

The repeated bit sequence is encoded to generate an encoded bit sequence (S930). In the example shown in FIG. 9, since a bit sequence to be transmitted is obtained by applying 2× block-wise repetition to the scrambled bit sequence and then encoded, the tail bits are not repeated and present only at last. Accordingly, compared with the example shown in FIG. 7, as many bits as the number of the tail bits may be saved, and the saved length of bits may be used for implementing other types of information.

Steps S940 to S990 after encoding are the same as steps S740 to S790 of FIG. 7, and the detailed description is not repeated.

In the transmission method according to FIGS. 8 and 9, 2× block-wise repetition applies prior to encoding, and the number of all bits input to the encoder for encoding is twice as many as that of the bit sequence to be transmitted. Thus, encoding performance may be enhanced. Further, in the transmission method shown in FIGS. 8 and 9, for encoding the original bit sequence and repeated bit sequence, the size of the encoded input block is increased twice compared with the method shown in FIG. 7.

As in the example of the transmission method shown in FIGS. 8 and 9, a method is described which effectively implements information included in the SIG field by applying as many additional bits as the number of tail bits obtained by performing 2× block-wise repetition before encoding.

The following Table 3 shows a configuration of SIG fields that have undergone OFDM symbol repetition.

TABLE 3

| SIG Field | Bits | Description |
| --- | --- | --- |
| STBC | 1 | Set to 1 if all spatial streams of all users have space time block coding and set to 0 otherwise. |
| Num SS | 2 | Number of spatial streams for single user |
| SGI | 1 | Short Guard Interval |
| Coding | 2 | 1st bit is coding type (LDPC/BCC), 2nd bit is for LDPC $N_{sym}$ ambiguity |
| Beamformed | 1 | Indicates the receiver if a Beamforming steering matrix is applied to the waveform in an SU transmission |
| MCS | 4 | The MCS for SU case |
| Aggregation bit | 1 | Signals use of A-MPDU |
| Length | 9 | Length field (in symbols when aggregation is ON, is in bytes when aggregation is OFF, Mandate A-MPDU for packet sizes is greater than 511 bytes |

TABLE 3-continued

| SIG Field | Bits | Description |
|---|---|---|
| Reserved | 4 | |
| Dopller/Midamble | 1 | TBD |
| CRC | 4 | 4 bits of CRC should be enough |
| Tail | 6 | |
| Total | 36 | |

In case the OFDM symbol repetition as shown in FIG. 6 applies, if the SIG fields are generated according to the transmission method, when a total of 36 bits of bit sequence are scrambled by a scrambler and then encoded, ½ code rate applies so that 72 bits of encoded bit sequence are generated as an output sequence, which is subjected to 2× block-wise repetition, thereby generating a total of 144 bits of sequence. In such process, since the 2× block-wise repetition has indeed repeated the encoded bit sequence after encoding, an effect is obtained that the 6 tail bits in Table 3 are also repeated. The 144 bits of sequence which is an output sequence of the 2× block-wise repetition is divided into each of the SIG fields of the six symbols so that 24 bits of data bit sequence per OFDM symbol are input to the interleaver.

Meanwhile, if the SIG field is generated according to the transmission method to which the OFDM symbol repetition as shown in FIGS. 8 and 9 is applicable, in the case of the example shown in FIG. 8, a total of 36 bits of sequence is subjected to 2× block-wise repetition, thus resulting in 72 bits of sequence. In the case of the example shown in FIG. 9, a total of 36 bits of sequence turns into 36 bits of scrambled bit sequence by the scrambler, and is subjected to 2× block-wise repetition, thus resulting in 72 bits of sequence. In such case, since a sequence of 72 bits is input to the encoder, the sequence repeated twice that used in the transmission method shown in FIG. 7 were a sequence of 32 bits is input to the encoder is encoded by the encoder. In this case, since a total of 72 bits of sequence is simultaneously input as an input for FEC encoding, tail bits are present only at the last 6 bits of the total of 72 bits, the tail bits in Table 3 end up being reduced to 3 bits.

Resultantly, the present invention suggests including partial AID (PAID) bit in the SIG field through an effect of effectively saving three tail bits. Accordingly, the format of the SIG field may be suggested as in Table 4.

TABLE 4

| SIG Field | Bits | Description |
|---|---|---|
| STBC | 1 | Set to 1 if all spatial streams of all users have space time block coding and set to 0 otherwise. |
| Num SS | 2 | Number of spatial streams for single user |
| SGI | 1 | Short Guard Interval |
| Coding | 2 | 1st bit is coding type(LDPC/BCC), 2nd bit is for LDPC $N_{sym}$ ambiguity |
| Beamformed | 1 | Indicates the receiver if a Beamforming steering matrix is applied to the waveform in an SU transmission |
| MCS | 4 | The MCS for SU case |
| Aggregation bit | 1 | Signals use of A-MPDU |
| Length | 9 | Length field(in symbols when aggregation is ON, is in bytes when aggregation is OFF, Mandate A-MPDU for packet sizes is greater than 511 bytes |
| Reserved | 1 | |
| Dopller/Midamble | 1 | TBD |
| Partial AID | 6 | |
| CRC | 4 | 4 bits of CRC should be enough |
| Tail | 3 | By 2× block-wise repetition before FEC, the tail bits become 6 |
| Total | 36 | |

Hereinafter, a method is described in detail that generates a data OFDM symbol for transmission through OFDM symbols in case OFDM symbol repetition is applicable to the data field in the PPDU having the format shown in FIG. 6.

First, as a method of generating data OFDM symbols to which OFDM symbol repetition applies, a scheme of using an interleaver for 1 MHz corresponding to 24 points is suggested that is based on a transmission method that has undergone OFDM symbol repetition as shown in FIG. 7. For ease of description, data OFDM symbols for all data fields may be constituted of data 1 (Data1), and repeated data1 Data1rep, Data2, Data2rep, Data3, and Data3rep. Here, Data1 rep is an OFDM symbol generated by applying OFDM symbol repetition to Data1, and Data2rep is an OFDM symbol generated by applying OFDM symbol repetition to Data2.

Figure 10:
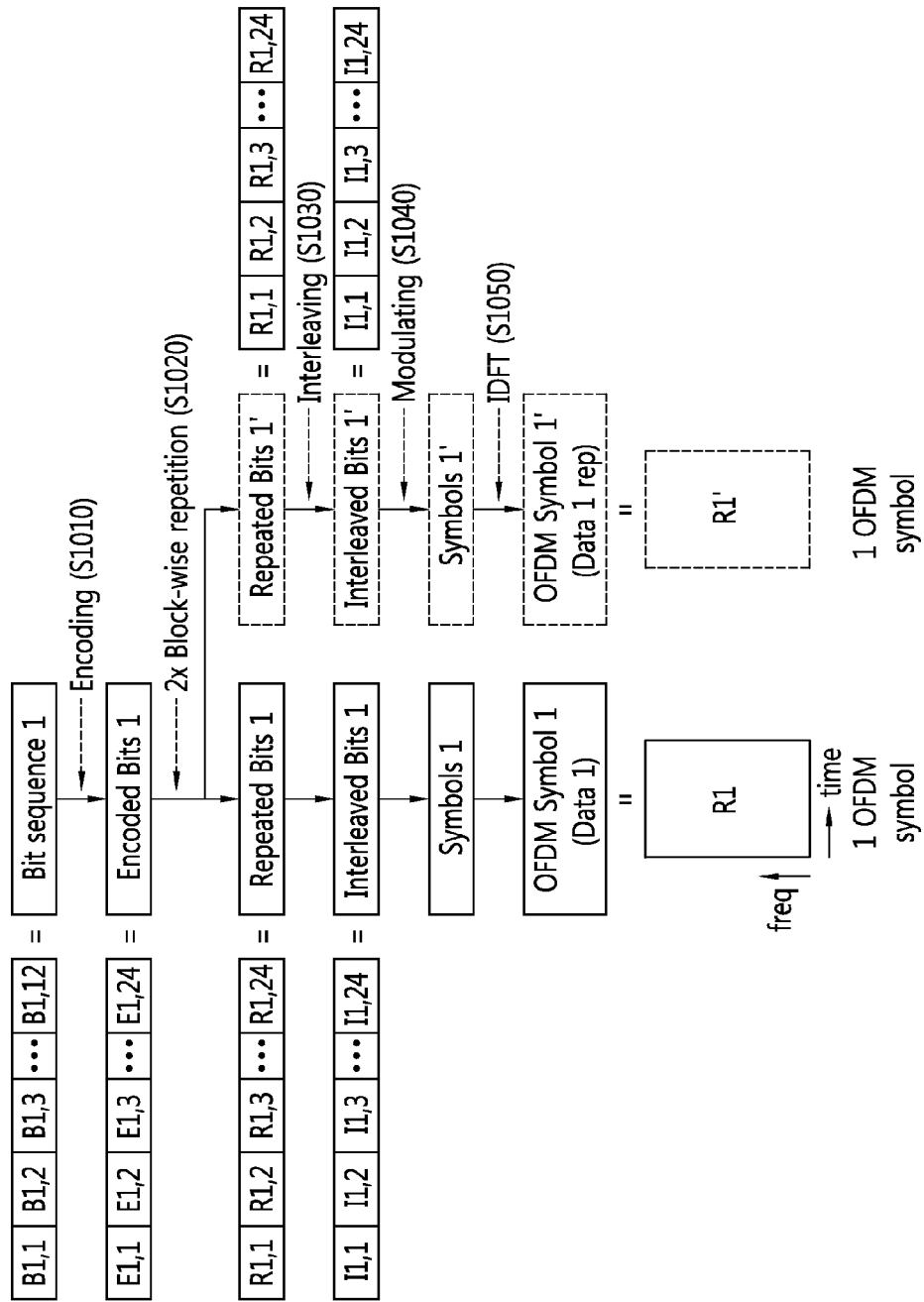
FIG. 10 is a view illustrating a method of generating a data OFDM symbol for a transmission method according to an embodiment of the present invention.

FIG. 10 is a view illustrating a method of generating a data OFDM symbol for a transmission method according to an embodiment of the present invention.

Referring to FIG. 10, the transmission STA encodes a data bit sequence to be transmitted, thereby generating an encoded bit sequence (S1010). In such case, the data bit sequence to be transmitted may be a sequence of 24 bits that fits for the size of the interleaver. The coding scheme used for encoding is BCC or LDPC as FEC encoding.

The transmission STA generates a repeated bit sequence by applying 2× block-wise repetition to the encoded bit sequence (S1020). The repeated bit sequence generated through the 2× block-wise repetition may be a sequence of 48 bits whose length is twice that of the existing data bit sequence of 24 bits.

The repeated bit sequence generated by performing 2× block-wise repetition is interleaved (S1030). In such case, the repeated bit sequence is divided in half, and each divided bit sequence may be interleaved by its respective interleaver. In this example, the repeated bit sequence of a total of 48 bits that has undergone repetition is divided into bits sequences each of which has a length of 24 bits, and each repeated bit sequence of 24 bits is interleaved by a 24-point interleaver block.

The interleaved bit sequences are generated as data symbols through modulation (S1040). BPSK may be used as a modulation scheme.

Each data symbol is generated as a data OFDM symbol through IDFT (S1050). Through this, the original data bit sequence is generated as Data1 which is a data OFDM symbol, and a data bit sequence repeated through 2x block-wise repetition is generated as Data1rep that is a repeated data OFDM symbol.

Subsequent data are also generated as data OFDM symbols through the above-described process so that the original data OFDM symbols and repeated data OFDM symbols, such as Data2, Data2rep, Data3, and Data3rep, may be generated.

The transmission STA may transmit the thusly generated OFDM symbols through a wireless medium.

In contrast to the data OFDM symbol generation method described above in connection with FIG. 10, in which the repeated bit sequence generated through 2x block-wise repetition is divided and each divided bit sequence is interleaved, the present invention as shown in FIG. 10 additionally suggests an OFDM symbol generation method that is applied with a scheme of interleaving the whole repeated bit sequence. In such case, a 2 MHz interleaver block corresponding to 52 points may be applicable to each interleaver. Such data OFDM symbol generation method is described in detail with reference to FIG. 11.

Figure 11:
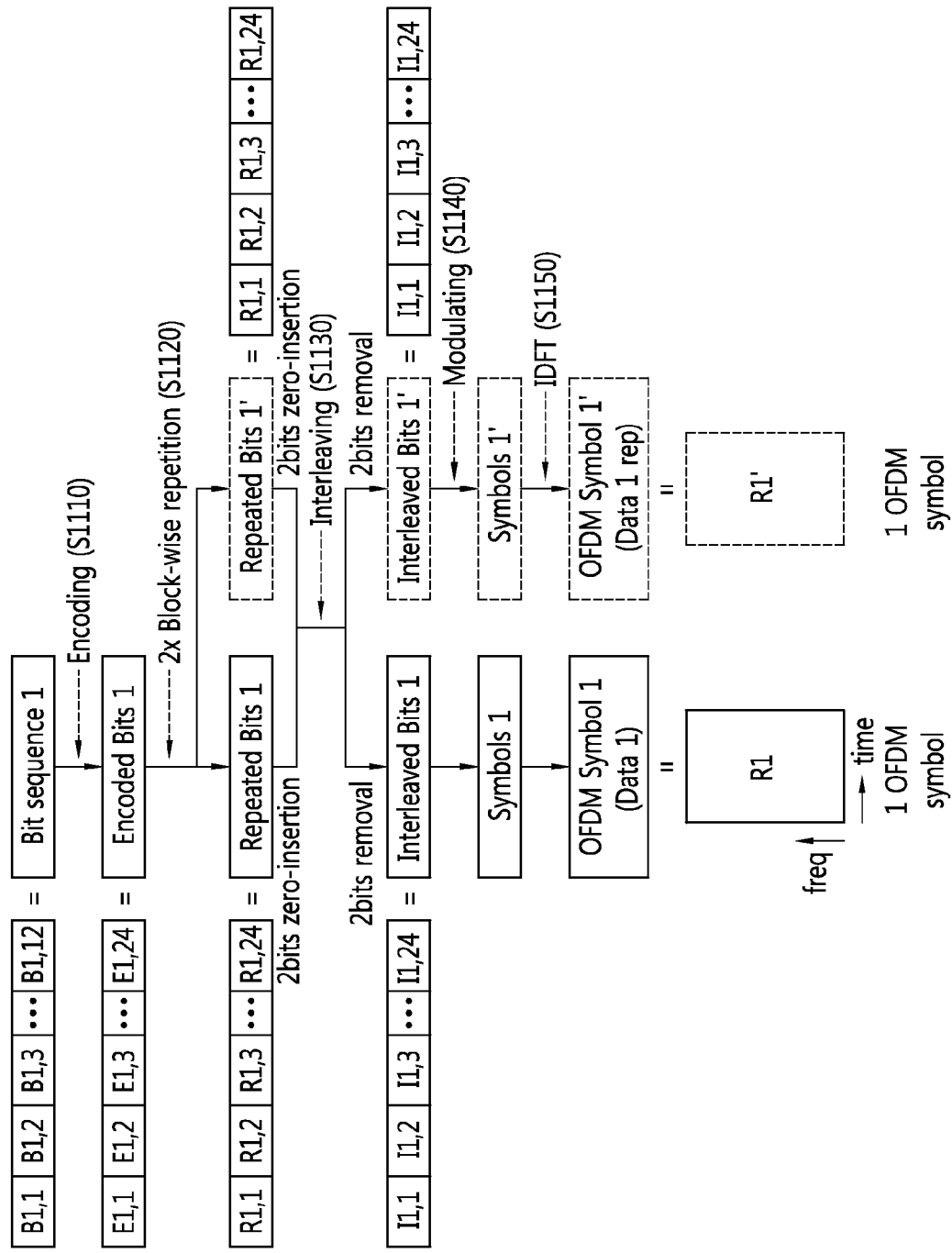
FIG. 11 is a view illustrating another example of a data OFDM generation method according to an embodiment of the present invention.

FIG. 11 is a view illustrating another example of a data OFDM generation method according to an embodiment of the present invention.

Referring to FIG. 11, the transmission STA encodes a data bit sequence to be transmitted, thus generating an encoded bit sequence (S1110). In such case, the data bit sequence to be transmitted may be a sequence of 24 bits that fits for the size of the interleaver. A coding scheme used for encoding, BCC or LDPC may be used as FEC encoding.

The transmission STA generates a repeated bit sequence by applying 2x block-wise repetition to the encoded bit sequence (S1120). The repeated bit sequence generated by the 2x block-wise repetition may be a sequence of 48 bits whose length is twice that of the existing data bit sequence of 24 bits.

The repeated bit sequence generated by performing 2x block-wise repetition is interleaved (S1130). In such case, the repeated bit sequence may be interleaved through one interleaver block. The interleaver block used in this example may be a 52 points interleaver block. Meanwhile, in case the length of the repeated bit sequence input to the interleaver is 48 bits, the lacking 4 bits may be compensated by performing zero-insertion.

In case of assuming that that the repeated bit sequence generated by performing 2x Block-wise repetition comprises [seq 1], which is an original bit sequence, and [seq 2], which is an repeated bit sequence of the [seq 1], the zero-insertion for the lacking 4 bits is implemented as below:
  1. Each 1 dummy bit is added to both ends of each sequence as follow:
    [0, seq 1, 0], [0, seq 2, 0]
  2. 2 dummy bits are added to both ends of the whole bit sequence as follow:
    [0, 0, seq 1], [seq 2, 0, 0]
  3. 2 dummy bits are added to end of each bit sequence as follow:
    [seq 1, 0, 0], [seq 2, 0, 0]
  4. 2 dummy bits are added to front of each bit sequence as follow:
    [0, 0, seq 1], [0, 0, seq 2]

The above-described dummy bits are inserted only to fit the input bit length of the 52 points interleaver block, and the corresponding bit index may be previously known when zero-inserted bits are output from the 52 points bit sequence that is an interleaver block output. Accordingly, the bits corresponding to the bit index are removed to be rearranged as a 48 bits interleaver output bit sequence.

The bit sequence interleaved by the interleaver block is modulated to thereby generate a data symbol (S1140). The interleaved bit sequence having a length of 48 bits is divided into 24 bits interleaved bit sequences each of which is then modulated. As a modulation scheme, BPSK may be used.

Each data symbol is generated as a respective data OFDM symbol through IDFT (S1150). Through this, the original data bit sequence is generated as Data1 that is a data OFDM symbol, and the data bit sequence repeated through 2x block-wise repetition is generated as Data1rep that is a repeated data OFDM symbol.

Subsequent data bit sequences also undergo the above-described process and are thereby generated as OFDM symbols, thus resulting in the original data OFDM symbols and repeated data OFDM symbols, such as Data2, Data2rep, Data3, and Data3rep, being generated.

The transmission STA may transmit the thusly generated OFDM symbol via a wireless medium.

The above-described data OFDM symbol generation method may also b used upon 1 MHz transmission of the 52 points interleaver for 2 MHz transmission, thus resulting in complexity due to implementation of additional interleaving means being decreased. Since the OFDM symbol repetition-applied data bit sequence for 1 MHz transmission is interleaved not by the 24 points interleaver for 1 MHz but by the 52 points interleaver for 2 MHz, further enhanced frequency diversity effects may be obtained through twice or more increased interleaving depth.

In the data OFDM symbol generation method according to FIG. 11, various methods may be suggested to fit the length of the interleaver input bits, such as zero insertion. However, it should be noted that various modifications are included in the scope of the present invention, such as inserting dummy bits in order to fit the interleaver input bit length and removing them after the corresponding bits are interleaved.

Figure 12:
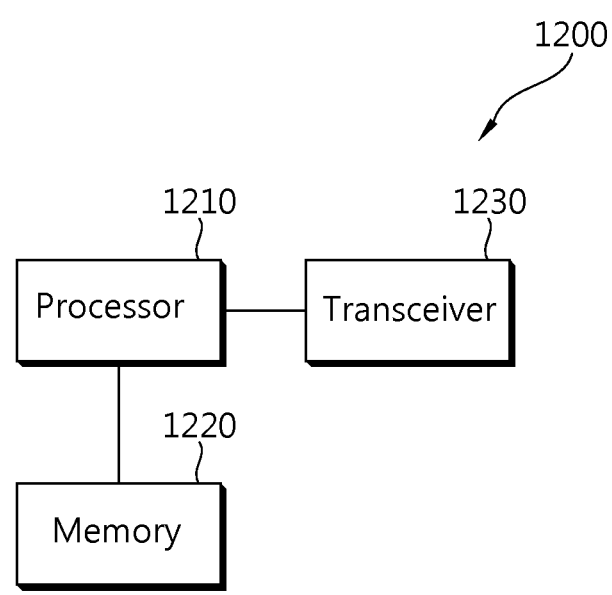
FIG. 12 is a block diagram illustrating a wireless device that may implement the embodiments of the present invention.

FIG. 12 is a block diagram illustrating a wireless device that may implement the embodiments of the present invention.

Referring to FIG. 12, a wireless device 1200 includes a processor 1210, a memory 1220, and a transceiver 1230. The transceiver 1230 transmits and/or receives a wireless signal and implements a physical layer of IEEE 802.11. The processor 1210 may be configured to operate while operatively coupled with the transceiver 1230.

The processor 1210 may be configured to generate a data unit having a format as shown in FIGS. 5 and 6. The processor 1210 may be configured to generate a data unit by the data unit generation method according to FIGS. 7 to 11 and to transmit the generated data unit.

The processor 1210 and/or transceiver 1230 may include ASICs (Application-Specific Integrated Circuits), other chipsets, logic circuits and/or data processing devices. When the embodiments are implemented in software, the above-described may be realized as modules (procedures or functions) that perform the above-described functions. The modules may be stored in the memory 1220 and executed by the processor 1210. The memory 1220 may be included in the processor 1210 and may be operatively coupled with the processor 1210 via various known means that are separately provided outside the processor 1210.

In the above-described exemplary system, the methods are described based on flowcharts with a series of steps or blocks, but the present invention is not limited to the order of the steps, and some steps may be performed simultaneously with or in an order different from other steps. Further, it may be understood by those skilled in the art that the steps in the flowcharts may include, without excluding, other steps or one or more steps in the flowcharts may be omitted without influencing the scope of the present invention.

What is claimed is:

1. A method for transmitting a data unit, performed by a transmitting station, in a wireless local area network system, the method comprising:
   generating a repeated bit sequence having a length of 144 bits, the repeated bit sequence including a first data bit sequence and a second data bit sequence each having a length of 72 bits, the second data bit sequence being obtained by repeating the first data bit sequence;
   generating, with an interleaver having a block size of 24 bits, an interleaved bit sequence by interleaving the repeated bit sequence;
   generating, with a modulation circuit, at least one modulation symbol by modulating the interleaved bit sequence;
   generating at least one orthogonal frequency division multiplexing (OFDM) symbol by performing an Inverse Discrete Fourier Transform (IDFT) on the at least one modulation symbol; and
   transmitting, by the transmitting station, the at least one OFDM symbol to a receiving station.

2. The method of claim 1, wherein the first data bit sequence includes Binary Convolution Coding (BCC) encoded information bits.

3. The method of claim 2, wherein the BCC-encoded information bits includes information about a modulation and coding scheme (MCS) and a number of spatial streams.

4. The method of claim 1, wherein the at least one modulation symbol includes at least one Binary Phase Shift Keying (BPSK) symbol.

5. The method of claim 1, wherein the at least one OFDM symbol is six OFDM symbols.

6. The method of claim 5, wherein the six OFDM symbols are transmitted over 1 MHz channel bandwidth.

7. A wireless apparatus operating in a wireless local area network system, the wireless apparatus comprising:
   a transceiver configured to transmit and receive radio signals; and
   a processor operatively coupled with the transceiver, wherein the processor is configured to:
      generate a repeated bit sequence having a length of 144 bits, the repeated bit sequence including a first data bit sequence and a second data bit sequence each having a length of 72 bits, the second data bit sequence being obtained by repeating the first data bit sequence,
      generate an interleaved bit sequence by interleaving the repeated bit sequence, the interleaving having a block size of 24 bits,
      generate at least one modulation symbol by modulating the interleaved bit sequence,
      generate at least one orthogonal frequency division multiplexing (OFDM) symbol by performing an Inverse Discrete Fourier Transform (IDFT) on the at least one modulation symbol, and
      control the transceiver to transmit the at least one OFDM symbol to a receiving station.

8. The apparatus of claim 7, wherein the first data bit sequence includes Binary Convolution Coding (BCC)-encoded information bits.

9. The apparatus of claim 8, wherein the BCC-encoded information bits includes information about a modulation and coding scheme (MCS) and a number of spatial streams.

10. The apparatus of claim 7, wherein the at least one OFDM symbol is six OFDM symbols.

11. The apparatus of claim 10, wherein the six OFDM symbols are transmitted over 1 MHz channel bandwidth.

* * * * *